United States Patent
Elliott

(10) Patent No.: US 6,753,769 B1
(45) Date of Patent: Jun. 22, 2004

(54) PROGRESSIVE SLOW-STOP SIGNALING SYSTEM

(76) Inventor: Lawrence T. Elliott, 1131 East End, Round Lake, IL (US) 60073

( * ) Notice: Subject to any disclaimer, the term of this patent is extended or adjusted under 35 U.S.C. 154(b) by 0 days.

(21) Appl. No.: 10/166,245

(22) Filed: Jun. 10, 2002

Related U.S. Application Data

(63) Continuation-in-part of application No. 10/113,912, filed on Mar. 29, 2002, now abandoned.
(60) Provisional application No. 60/279,835, filed on Mar. 29, 2001.

(51) Int. Cl.[7] ............................................. B60Q 1/50
(52) U.S. Cl. .................. 340/464; 340/467; 340/479
(58) Field of Search ................... 340/463, 464, 340/466, 467, 471, 479

(56) References Cited

U.S. PATENT DOCUMENTS

| | | | |
|---|---|---|---|
| 3,634,792 A | 1/1972 | Blomenkamo | |
| 3,638,181 A | 1/1972 | Bryant | |
| 3,784,974 A | 1/1974 | Hamashige | |
| 3,806,870 A | 4/1974 | Kalaiian | |
| 3,911,394 A | 10/1975 | Shames | |
| 3,921,750 A | 11/1975 | Shames | |
| 3,949,361 A | 4/1976 | Replogie | |
| 3,968,395 A | * 7/1976 | Obermaier | 340/467 |
| 4,034,338 A | 7/1977 | Bevilacqua | |
| 4,149,141 A | 4/1979 | Tanimura | |
| 4,231,013 A | * 10/1980 | Freeman et al. | 340/479 |
| 4,470,036 A | 9/1984 | Doerr et al. | |
| 4,600,913 A | 7/1986 | Caine | |
| 4,894,640 A | * 1/1990 | Beasley et al. | 340/464 |
| 4,916,431 A | * 4/1990 | Gearey | 340/479 |
| 4,920,330 A | * 4/1990 | Plozner | 340/467 |
| 5,491,466 A | * 2/1996 | Maiocco, Sr. | 340/467 |
| 5,504,472 A | * 4/1996 | Wilson | 340/479 |
| 5,589,817 A | 12/1996 | Furness | |
| 5,594,415 A | * 1/1997 | Ishikawa et al. | 340/467 |
| 5,594,416 A | * 1/1997 | Gerhaher | 340/467 |
| 5,663,707 A | * 9/1997 | Bartilucci | 340/467 |
| 5,682,137 A | 10/1997 | Li | |
| 5,786,752 A | * 7/1998 | Bucalo et al. | 340/467 |
| 5,856,793 A | * 1/1999 | Tonkin et al. | 340/467 |
| 6,147,600 A | * 11/2000 | Faye | 340/467 |
| 6,163,256 A | * 12/2000 | Brown | 340/479 |
| 6,211,780 B1 | * 4/2001 | Kashefy | 340/467 |
| 6,268,792 B1 | * 7/2001 | Newton | 340/467 |
| 6,294,987 B1 | * 9/2001 | Matsuda et al. | 340/467 |
| 6,573,830 B2 | * 6/2003 | Cohen et al. | 340/479 |

* cited by examiner

*Primary Examiner*—Benjamin C. Lee
(74) *Attorney, Agent, or Firm*—Jon Carl Gealow

(57) ABSTRACT

A progressive slow/stop signaling system for energizing a plurality of yellow and red lamps mounted on the rear of a vehicle of impending changes in the speed of the vehicle. The lamps are energized in a sequence depending on the position of the brake and accelerator pedals.

15 Claims, 4 Drawing Sheets

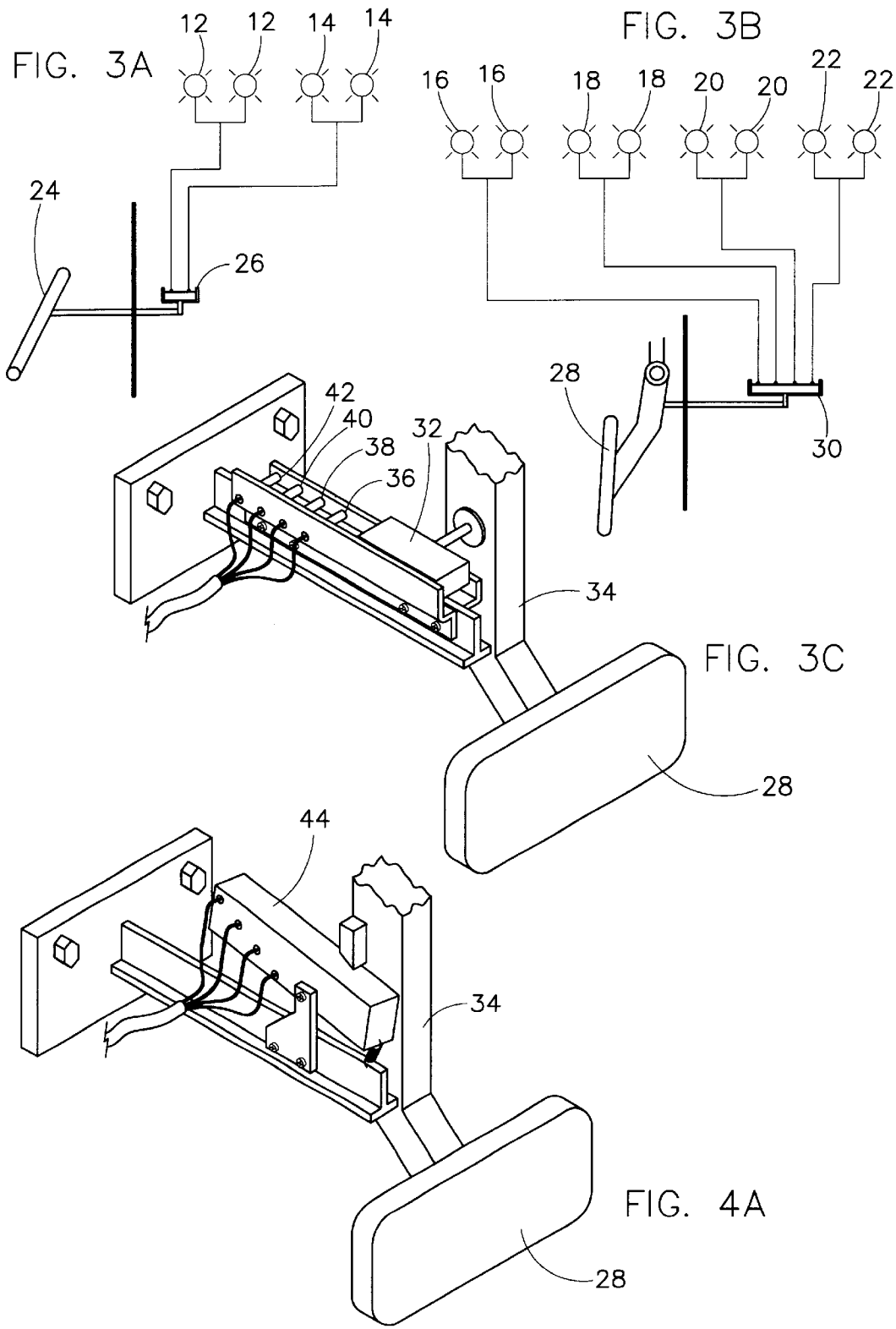

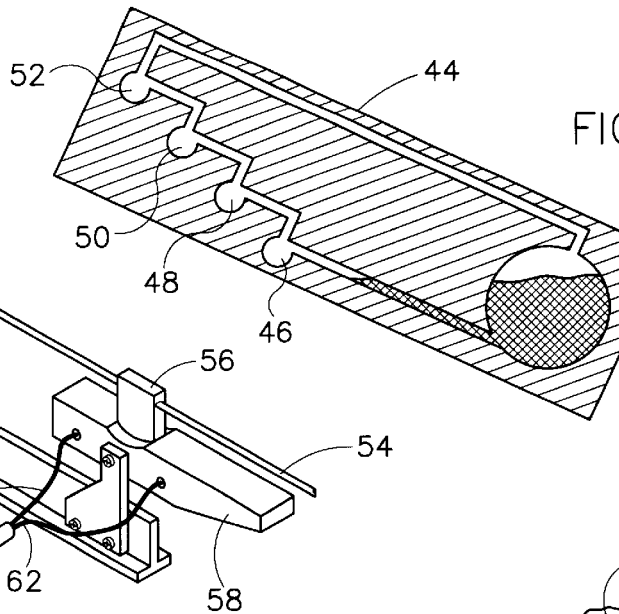
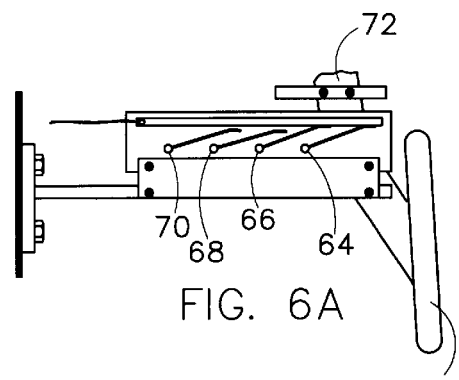
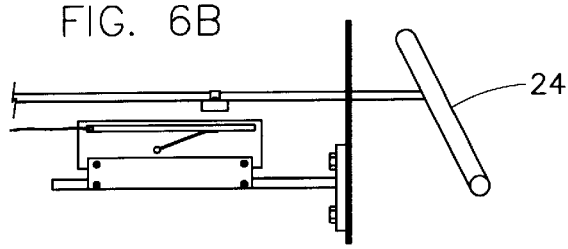
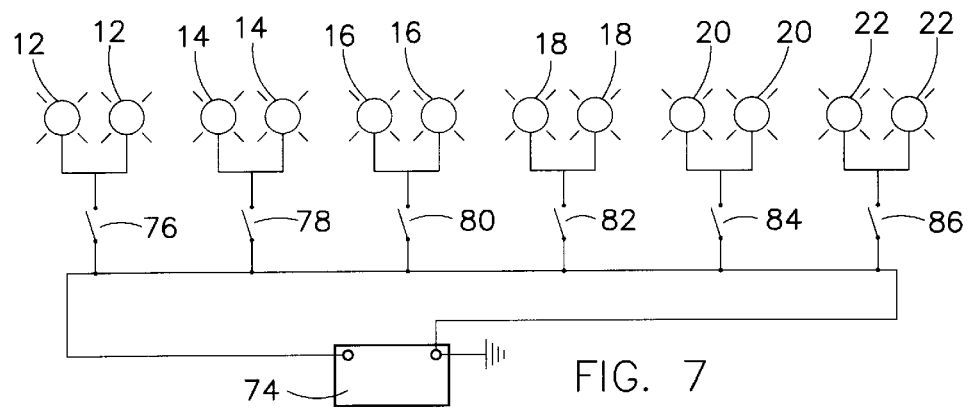

PROGRESSIVE SLOW-STOP SIGNALING SYSTEM

CROSS-REFERENCE TO RELATED APPLICATIONS

This application is a continuation-in-part of U.S. patent application Ser. No. 10/113,912, filed Mar. 29, 2002, expressly abandoned, which incorporated by reference in its entirety for its teachings, which claims priority from U.S. application Ser. No. 60/279,835 for PROGRESSIVE SLOW/STOP SIGNALING SYSTEM by Lawrence T. Elliott, filed Mar. 29, 2001.

FIELD OF THE INVENTION

The present invention relates to system to be provided on a vehicle whereby the driver of a following vehicle is notified of impending changes in the speed of the vehicle. The system energizes a plurality of yellow and red lights mounted on the rear of the vehicle based upon the position of the brake and accelerator pedals of the vehicle.

BACKGROUND OF THE INVENTION

Currently, the only warning given of a change in speed of a vehicle to a following driver is the illumination of brake lights when the brake pedal is depressed. While it is highly recommended that vehicles follow at a safe distance, a panic stop of a preceding vehicle frequently result in rear end collisions. This is particularly true when the preceding vehicle is a large one such and a semi tractor trailer unit or a large van which completely block the view of a following driver with respect to the traffic in front of the preceding vehicle. Further, following at a presumed safe distance on a busy expressway can result in a greater likelihood of an accident than if one were to maintain a closer spacing. This is because aggressive drivers frequently use what one driver considers to be a safe interval, to be an interval large enough for the aggressive driver to move into when passing the following vehicle.

A study has shown that 80% of the rear end accidents could be prevented with just one more second to react. While looking ahead to the flow of traffic could help, drivers are often distracted by other things. Further, when following a large vehicle such as a truck or semi-tractor trailer, it is usually not possible to observe the traffic ahead of the truck or semi-tractor trailer.

Accordingly, it would be advantageous to provide a more readily visible indication of a potential change in speed of a vehicle to a driver following that vehicle.

SUMMARY OF THE INVENTION

It is an object of this invention to provide a readily visible indication of a potential change in speed of a vehicle to a driver following that vehicle. It is a further object of this invention to provide such a visual indication with the illumination one or more of a plurality of lamps mounted on the rear of a vehicle. It is a still further object of this invention to control the illumination of the plurality of lamps dependent upon the position of the brake and accelerator pedals of the vehicle.

In accordance with this invention, a progressive slow/stop signaling system is provided on a vehicle to warn following vehicles of impending changes in speed of the vehicle. The installation of the applicant's progressive slow/stop signaling system on a vehicle provides more timely and complete information on changes in speed of a vehicle to the driver of a following a vehicle provided with applicant's progressive slow/stop signaling system. A plurality of yellow and red lights are mounted on the rear of a vehicle in a position to be readily observed by a following vehicle. In a preferred embodiment, the yellow lights are positioned to the left of the red lights. The energization of the lights are controlled by the operation of the vehicle accelerator pedal and brake pedal. As the accelerator pedal is progressively released, the yellow lights are progressively energized from left to right, such that with the accelerator pedal fully released, all of the yellow lights are illuminated. As the brake pedal is progressively depressed, the red lights are progressively energized from left to right. With the brake pedal fully depressed, all of the red lights are illuminated.

Thus, in accordance with the applicant's invention, a readily noticeable lighting display viewable from the rear of a vehicle informs the driver of a following vehicle of impending changes in speed of the vehicle.

BRIEF DESCRIPTION OF THE DRAWINGS

FIG. 3A is a schematic drawing of the accelerator pedal of a vehicle with two sets of lamps, the energization of which is controlled by the position of the accelerator pedal, in accordance with this invention;

FIG. 3B is a schematic drawing of the brake pedal of a vehicle with four sets of lamps, the energization of which is controlled by the position of the brake pedal, in accordance with this invention;

FIG. 3C is a perspective view of a brake pedal showing a first sensing system for energizing the lamps in response to the position of the brake pedal, in accordance with this invention;

FIG. 4A is a perspective view of a brake pedal showing a second sensing system for energizing the lamps in response to the position of the brake pedal, in accordance with this invention;

FIG. 4B is a cross-sectional view of a portion of the sensing system shown in FIG. 4A;

FIG. 5 is a perspective view of another sensing system for detecting the position of a brake or accelerator pedal in accordance with this invention;

FIG. 6A is a perspective view of still another sensing system for detecting the position of a brake or accelerator pedal in accordance with this invention;

FIG. 6B is a perspective view of still another sensing system for detecting the position of a brake or accelerator pedal in accordance with this invention;

FIG. 7 is a schematic wiring diagram of the lamp as shown in FIGS. 1 and 2; and, FIG. 8 is a schematic view of yet another sensing system for controlling the energization of the signaling lamps or bulbs.

DETAILED DESCRIPTION OF THE PREFERRED EMBODIMENT

Figure 1:
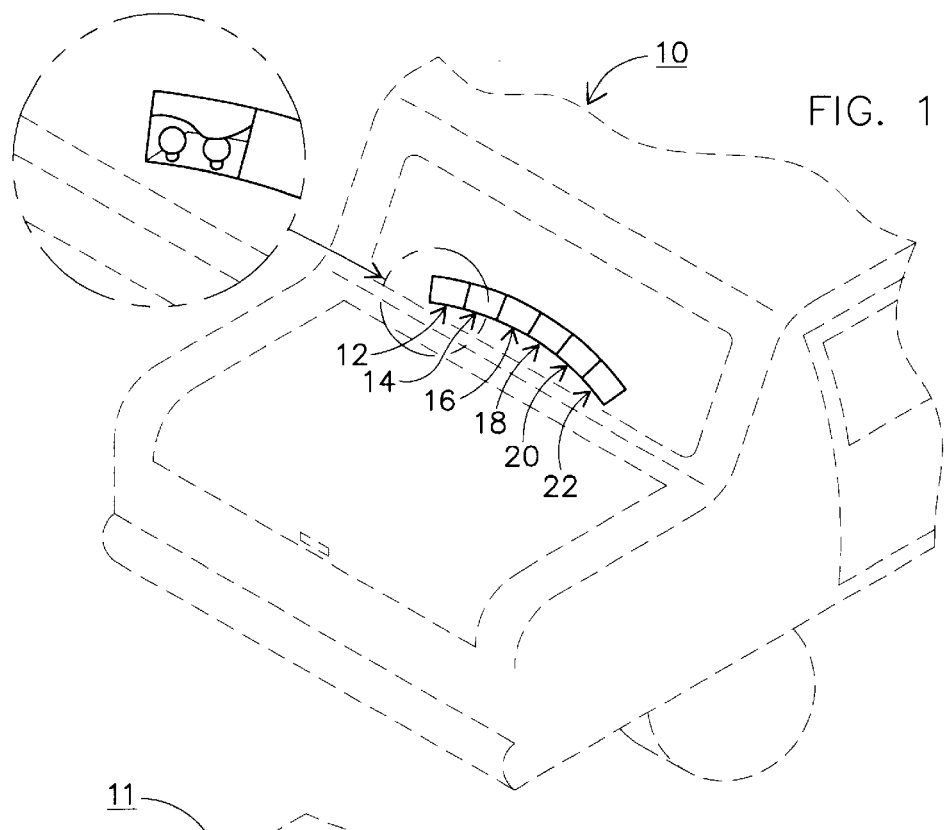
FIG. 1 is a rear perspective view of an automobile provided with the signaling lamps or bulbs of this invention.
Figure 2:
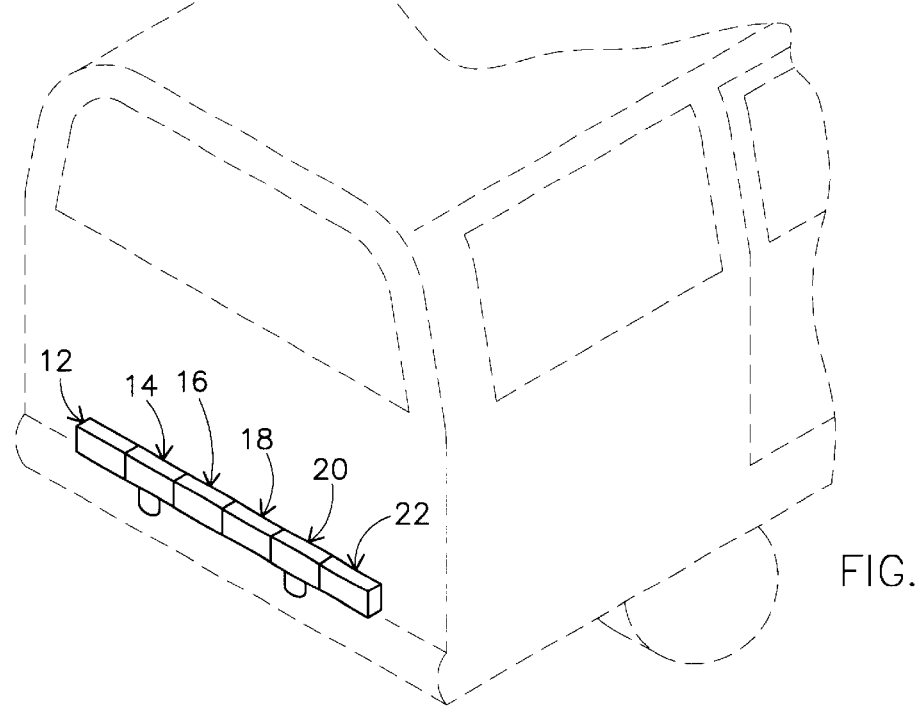
FIG. 2 is a rear perspective view of a van type vehicle provided with the signaling lamps or bulbs of this invention.

Referring to FIG. 1, the signaling lamps on the rear of a car 10 include six lamp fixtures, 12, 14, 16, 18, 20, and 22 mounted in an arcuate arrangement. Each of the fixtures includes two bulbs. The bulbs are provided in pairs, as a safety precaution with respect to bulb burn-out. Fixtures 12 and 14 are provided with amber or yellow lamps or bulbs, while fixtures 16, 18, 20, and 22 are provided with red lamps or bulbs. FIG. 2 shows the signaling bulb mounted in a linear arrangement on the rear of large van type vehicle 11. As shown in FIGS. 1 and 2, the fixture may support the bulbs in a linear or in an arcuate arrangement. If not provided as original equipment with a vehicle, the fixture may be mounted inside the rear window of the vehicle, or above or below the trunk of an automobile. On large trucks they may be mounted on a portion of the under carriage of the truck.

Based upon the positions of the brake and accelerator pedals, the lamps in the lamp fixtures 12–22 are illuminated as follows to provide the indicated message:

| Lamp Fixture Energized | Message |
| --- | --- |
| 12 and 14 (yellow) | Stopped in traffic or parked with ignition on. |
| 12 (yellow) | Moving ahead. |
| 12 and 14 (yellow) | Slowing down, foot off of accelerator pedal. |
| 12 and 14 (yellow) and 16 (red) | Slow stop, brake pedal slightly depressed. |
| 12 and 14 (yellow) and 16 and 18 (red) | Deliberate stop, brake pedal further depressed. |
| 12 and 14 (yellow) and 16, 18, and 20 (red) | Fast stop, brake pedal even further depressed. |
| 12 and 14 (yellow) and 16, 18, 20, and 22 (red) | Panic stop, brake pedal depressed all the way. |

To provide the various signaling sequences of the lamps, switches are provided which are actuated in accordance with the position of the brake and accelerator pedals. As shown in FIG. 3A, motion of the accelerator pedal 24 is transmitted to a switching device 26, which dependent on the accelerator pedal position, energizes lamps 12 or lamps 12 and 14. As shown in FIG. 3B, the motion of the brake pedal 28 is transmitted to a switching device 30, which dependent on the position of the brake pedal position, energizes lamps 16, or lamps 16 and 18, or lamps 16, 18, and 20, or lamps 16,18, 20, and 22.

Various types of switching devices may be used to sense the position of the brake and accelerator pedals. As shown in FIG. 3C, a sliding contact 32 is connected to brake pedal arm 34, such that as the brake pedal is pressed, contacts 36, 38, 40, and 42 are engaged in that order with sliding contact 32. Contact 42 is connect to energize lamps 22, contact 40 to energize lamps 20, contact 38 to energize lamps 18, and contact 36 to energize lamps 16.

As shown in FIG. 4A, lamps 16, 18, 20, and 22 are connected to the terminals of a liquid metal switch 44, a cross-section of which is shown in FIG. 4B. As the housing is rotated counterclockwise upon depression of the brake pedal, the flow of liquid metal to 46 will cause lamps 16 to be energized, further rotation will cause to liquid metal to reach 48, which will cause lamps 18 to also be energized. Similarly, when the liquid metal reaches 50, lamps 20 will also be energizing, and when the liquid metal reaches 52, the lamps 22 will also be energized.

Referring to FIG. 5, a switch arrangement operated by movement of the accelerator pedal is shown. Movement of rod 54, causes member 56 to move to the left, tilting switch housing 58 to cause contact to be made with lead 60 to energize lamps 12. With the member 56 in the position shown, lead 62 is energized which causes lamps 12 and 14 to be energized.

Referring to FIG. 6A, spring steel contacts 64, 66, 68, and 70 are progressive engaged in sequence with a common contact to energize lamps 16, 18, 20, and 22 respectively. The spring steel contacts are brought into engagement with the common contact under the force of a magnet 72 which moves to the left as the brake pedal is depressed.

FIG. 6B, shows a switch arrangement similar to FIG. 6A for use with the accelerator pedal.

FIG. 7 shows a circuit diagram for energizing the lamps 12–22 from a battery 74. The switches 76 and 78 are actuated by movement of the accelerator pedal, and the switches 80, 82, 84, and 86 are operated by movement of the brake pedal.

Figure 8:
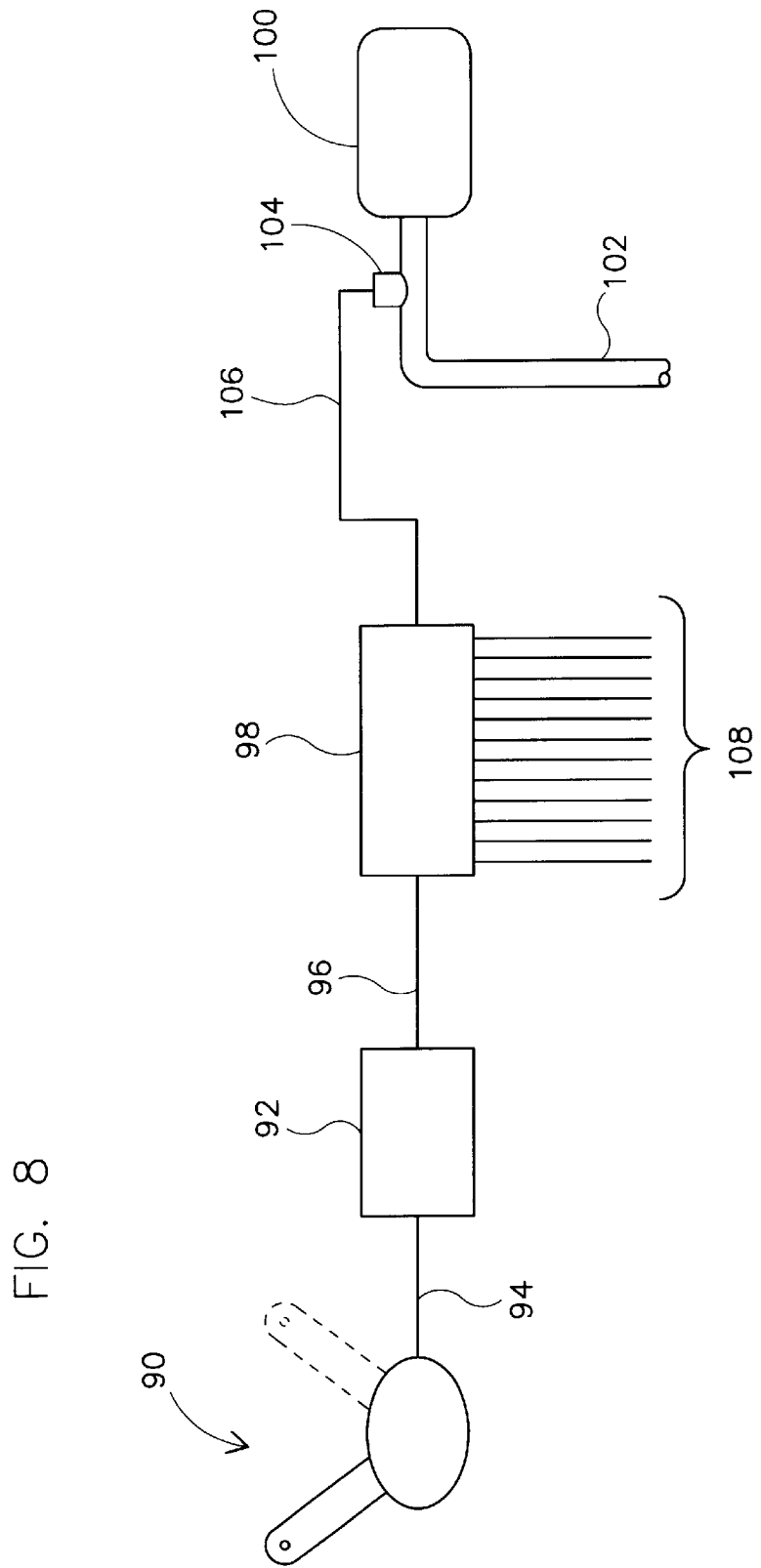

FIG. 8 shows a schematic diagram of still another way of controlling the energization of signal lamps by movement of accelerator and brake pedals in accordance with this invention. The position of the accelerator or throttle of the vehicle is provided through connection 94 to an electronic sensing device 92. The connection 94 may be either electrical or mechanical. If the throttle of the vehicle is already supplied with an electromechanical sensor, the connection 94 may provide an electrical signal to the electronic sensing device 92. In the alternative, electronic sensing device 92 may be an electromechanical sensing device, and the connection 94 will provide a mechanical movement input to the sensing device 92. The electronic sensing device 92 provides electrical signals through electrical connection 96 to a control circuit 98 to indicate the position of the throttle of the vehicle. The fluid pressure exerted by a brake master cylinder 100 to the brake line 102 is sensed by a pressure sensor 104. The pressure sensor 104 provides an electrical signals through the electrical connection 106 to the control circuit 98. The control circuit 98, which may be a constructed as an integrated circuit, responds to the signals provided through electrical connections 96 and 106 to provide electrical signals of leads 108 to energize the lamps as described in the previous embodiments of this invention.

While only one arrangement of the lighting sequence of this invention and several way of controlling the lighting sequence have been shown, it should be apparent to those skilled in the art that what has been described are considered at present to be preferred embodiments of the progressive slow/stop signaling system of this invention. In accordance with the Patent Statute, changes may be made in the progressive slow/stop signaling system without actually departing from the true spirit and scope of this invention. The appended claims are intended to cover all such changes and modification which fall in the true spirit and scope of this invention.

What is claimed is:

1. A progressive slow/stop signaling system for installation on a vehicle to warn the driver of a following vehicle of an impending change in the speed of the vehicle:

a group of six or more lamps mounted at the rear of the vehicle, a first switching device actuated by movement of the accelerator pedal, a second switching device actuated by movement of the brake pedal, the first switching device actuated by progressive movement of the accelerator pedal to decrease the speed of the vehicle controlling the progressive energization of a first portion of said group of lamps, such that an increasing number of said first portion of said group of lamps is energized with progressive movement of the accelerator pedal, the second switching device actuated by movement of the brake pedal to increase braking controlling the progressive energization of a second portion of said group of lamps, such that an increasing number of said second portion of said group of lamps is energized with the progressive movement of the brake pedal, thereby alerting a following driver to an impending change in the speed of the vehicle.

2. The progressive slow/stop signaling system of claim 1, wherein said first portion of said group of lamps includes at least two lamps one or both of which may be energized to alert a following driver of a decrease in speed of the vehicle without braking.

3. The progressive slow/stop signaling system of claim 2, wherein said first portion of said group of lamps are of an amber color.

4. The progressive slow/stop signaling system of claim 2, wherein each lamp of said first portion of said group of lamps consists of a pair of lamps, so as to provide redundance, in case of a lamp failure.

5. The progressive slow/stop signaling system of claim 1, wherein said second portion of said group of lamps includes four or more lamps, one or more of which may be energized progressively to alert a following driver of an increasingly sever decrease in speed of the vehicle because of braking.

6. The progressive slow/stop signaling system of claim 5, wherein said second portion of said group of lamps are red.

7. The progressive slow/stop signaling system of claim 5, wherein each lamp of said second portion of said group of lamps consists of a pair of lamps, so as to provide redundance, in case of a lamp failure.

8. A progressive slow/stop signaling system for installation on a vehicle to warn the driver of a following vehicle of an impending change in the speed of the vehicle:
   a group of six or more lamps mounted at the rear of the vehicle,
   an electronic sensing circuit for providing an electrical output signal representing the position of the throttle and accelerator pedal of the vehicle,
   a pressure sensitive device for providing an electrical output signal representing the pressure applied to the brake fluid by the master cylinder of the vehicle,
   an electronic control circuit, said electronic control circuit controlling progressive energization of a first portion of said group of lamps, in response to the electrical output signal from said electronic sensing circuit indicating progressive movement of the accelerator pedal, said electronic control circuit controlling progressive energization of a second portion of said group of lamps, in response to the electrical output signal of said pressure sensitive device indicating progressive movement of the brake pedal, thereby alerting a following driver to an impending change in the speed of the vehicle.

9. The progressive slow/stop signaling system of claim 8, wherein said electronic control circuit is an integrated circuit.

10. The progressive slow/stop signaling system of claim 8, wherein said first portion of said group of lamps includes at least two lamps one or both of which may be energized to alert a following driver of a decrease in speed of the vehicle without braking.

11. The progressive slow/stop signaling system of claim 10, wherein said first portion of said group of lamps are of an amber color.

12. The progressive slow/stop signaling system of claim 10, wherein each lamp of said first portion of said group of lamps consists of a pair of lamps, so as to provide redundance, in case of a lamp failure.

13. The progressive slow/stop signaling system of claim 8, wherein said second portion of said group of lamps includes four or more lamps, one or more of which may be energized progressively to alert a following driver of an increasingly sever decrease in speed of the vehicle because of braking.

14. The progressive slow/stop signaling system of claim 13, wherein said second portion of said group of lamps are red.

15. The progressive slow/stop signaling system of claim 13, wherein each lamp of said second portion of said group of lamps consists of a pair of lamps, so as to provide redundance, in case of a lamp failure.

* * * * *